(12) United States Patent
Kuroda (10) Patent No.: US 8,780,357 B2
(45) Date of Patent: Jul. 15, 2014

(54) OPTICAL DISPLACEMENT MEASUREMENT DEVICE WITH OPTIMIZATION OF THE PROTECTIVE FILM

(75) Inventor: Akihiro Kuroda, Tokyo (JP)

(73) Assignee: DMG Mori Seike Co., Ltd, Nara (JP)

( * ) Notice: Subject to any disclaimer, the term of this patent is extended or adjusted under 35 U.S.C. 154(b) by 291 days.

(21) Appl. No.: 13/446,709

(22) Filed: Apr. 13, 2012

(65) Prior Publication Data

US 2012/0257214 A1    Oct. 11, 2012

(30) Foreign Application Priority Data

Apr. 15, 2011    (JP) .................. P2011-091282

(51) Int. Cl.
  *G01B 11/02*    (2006.01)
  *G01B 9/02*    (2006.01)
  *G01D 5/347*    (2006.01)

(52) U.S. Cl.
  CPC ............ *G01D 5/34746* (2013.01); *G01D 5/347* (2013.01); *G01B 9/02075* (2013.01); *G01B 11/02* (2013.01)
  USPC .......................................... 356/499; 356/521

(58) Field of Classification Search
  CPC .............. G01D 5/347; G01D 5/34746; G01D 5/34761; G01D 5/38; G01D 5/266; G01B 11/02; G01B 9/02015; G01B 99/02018; G01B 9/02056–9/02059; G01B 9/02061; G01B 9/02075; G01B 9/02076; G01B 9/02077

USPC .......... 356/499, 521, 500–504; 359/566, 569, 359/572, 576, 577, 580, 582, 584, 586, 359/588–590

See application file for complete search history.

(56) References Cited

U.S. PATENT DOCUMENTS 6,115,153 A * 9/2000 Tomita et al. .................... 359/15
6,771,377 B2 * 8/2004 Jones et al. ..................... 356/616
(Continued)

FOREIGN PATENT DOCUMENTS

JP    61083911 A    *    4/1986
JP    02110319 A    *    4/1990
(Continued)

*Primary Examiner* — Michael A Lyons
*Assistant Examiner* — Violeta A Prieto
(74) *Attorney, Agent, or Firm* — Haverstock & Owens LLP (57) ABSTRACT

An optical displacement measurement device in which variations in interference light by stray light are suppressed to improve interpolation accuracy and detection accuracy. The surface of diffraction grating 11 is coated with protective layer 12 of thickness L and refractive index n. The protective layer has thickness L such that, with angle θ between a line normal to the protective layer and an incident light beam and an angle θ' between diffracted light generated by diffraction grating and reflected by boundary surface of protective layer to become stray light to be re-incident on diffraction grating and a line normal to diffraction grating, interference light is of an intensity of interference such that an optical path difference between stray light and light interfering with stray light represented by $\Delta = 2L(n/\cos \theta' + \tan \theta' \cdot \sin \theta)$ will amount to not higher than 2% of intensity of interference of interference light with optical path length difference $\Delta = 0$.

1 Claim, 11 Drawing Sheets

(56) References Cited

U.S. PATENT DOCUMENTS

| | | | |
|---|---|---|---|
| 7,808,650 B2* | 10/2010 | Kon et al. | 356/499 |
| 8,319,960 B2* | 11/2012 | Aiko et al. | 356/237.2 |
| 8,446,594 B2* | 5/2013 | Kuroda | 356/499 |
| 2009/0033946 A1* | 2/2009 | Kon et al. | 356/499 |
| 2010/0271473 A1* | 10/2010 | Aiko et al. | 348/92 |
| 2011/0310396 A1* | 12/2011 | Tamiya | 356/498 |
| 2011/0310397 A1* | 12/2011 | Kuroda | 356/499 |
| 2012/0050748 A1* | 3/2012 | Kuroda | 356/499 |
| 2012/0257214 A1* | 10/2012 | Kuroda | 356/499 |
| 2012/0287441 A1* | 11/2012 | Kuroda | 356/499 |

FOREIGN PATENT DOCUMENTS

| | | | |
|---|---|---|---|
| JP | 06241728 A | * | 9/1994 |
| JP | 2000081308 A | * | 3/2000 |
| JP | 2008256655 A | * | 10/2008 |

* cited by examiner

FIG. 10 portion to be enlarged

OPTICAL DISPLACEMENT MEASUREMENT DEVICE WITH OPTIMIZATION OF THE PROTECTIVE FILM

BACKGROUND OF THE INVENTION

1. Field of the Invention

This invention relates to an optical displacement measurement device in which phase change of light produced by movement of a diffraction grating is detected to measure the amount of movement of the diffraction grating.

2. Description of Related Art

As an optical displacement measurement device for detecting the position of relative movement of a movable portion of, for example, a machine tool or a semiconductor manufacturing device, there is known such device exploiting a grating interferometer. This device is configured to detect the displacement of the position of a diffraction grating, recorded on a moving scale, by taking advantage of light interference.

The present inventors already proposed an optical displacement measurement device which, by superimposing two diffracted light beams, which are to interfere with each other, to high accuracy, is capable of detecting the position of movement of a moving portion to high resolution and to high accuracy. See Patent Publication 1, for example.

In the technique disclosed in this Patent Publication 1, a coherent light beam forms an optical image on a grating surface of a diffraction grating by a first image-forming means. A first diffracted light beam is collimated by a second image-forming means and illuminated on a reflector of a reflection optical system in a perpendicular direction at all times. With such configuration, even in case the optical axis of the first diffracted light beam has become deviated, the first diffracted light beam as reflected necessarily retraces the optical path it followed as the incident light, with there being no change in the optical image forming position on the grating surface of the diffraction grating. On the other hand, the optical axis of a second diffracted light beam, generated on diffraction of the first diffracted light beam, is not deviated, while there is no change in the optical path length. In this manner, there is no deterioration in the interference signal being detected even in case the diffraction grating has moved in a direction other than the direction parallel to the grating vector, for example, in case the diffraction grating has become tilted or distorted.

If, in an optical scale for a grating interferometer, detecting changes in the phase of light caused by movement of the diffraction grating to detect the position, the diffraction grating is exposed to outside, fingerprints or impurities tend to be affixed to the scale, or the scale may be grazed. Thus, in Patent Publication 2, for example, a transparent protective layer is formed on the surface of the diffraction grating to cover and protect it from contamination or grazing.

Among the position detectors in which light diffracted from a diffraction grating is made to interfere to detect the amount of movement of the diffraction grating from changes in the interference signal, there is such a detector that uses multi-mode semiconductor laser as a light source. With this light source, the length of coherence of the light source is limited to suppress the effect of wavelength variations otherwise brought about by changes in temperature. See Patent Publication 2, for example.

With the use of the arrangements disclosed in the Patent Publications 2 and 3, it is possible to implement an optical displacement measurement device which is strong against grazing or contamination of the diffraction grating or against wavelength variations otherwise brought about by changes in temperature. See Patent Publication 3, for example.

PUBLICATIONS OF RELATED ART

Patent Publications

[Patent Publication 1] Japanese Laid-Open Patent Publication 2000-81308
[Patent Publication 2] Japanese Laid-Open Patent Publication 2008-256655
[Patent Publication 3] Japanese Laid-Open Patent Publication S61-83911
[Patent Publication 4] Japanese Laid-Open Patent Publication H-2-110319

SUMMARY OF THE INVENTION

Problems to be Solved by the Invention

If a transparent protective layer is formed on a surface of a diffraction grating, reflected light may be produced on a boundary surface between the protective layer and air. The reflected light may be re-incident on the diffraction grating to become stray light, which then interferes with inherent diffracted light, resulting in variations in the interference signal attendant on the movement of the diffraction grating, thereby lowering the position detection accuracy.

This situation may be suppressed to some extent with the use of a light source whose coherence length is limited. However, in the multi-mode semiconductor laser, there are a lot of intensity peaks in the interference signal in case the optical path length difference is varied, with the result that, depending on the thickness of the protective layer, the interference signal by the stray light is increased in intensity.

The present invention contemplates to solve the above mentioned problem inherent in the conventional technique. It is an object of the present invention to provide an optical displacement measurement device in which variations in the interference signal due to stray light is suppressed to improve the interpolation accuracy of the position detection signal and hence to improve detection accuracy.

Other objects and concrete advantages of the present invention will become more apparent from the following explanation of preferred embodiments especially when read in conjunction with the drawings.

Means to Solve the Problem

According to the present invention, the thickness of a protective layer L is set so that, with an angle $\theta$ between a line normal to the protective layer and an incident light beam and an angle $\theta'$ between diffracted light generated by a diffraction grating and reflected by a boundary surface of the protective layer to become stray light to be re-incident on the diffraction grating and a line normal to the surface of the diffraction grating, the value of $\Delta = 2L(n/\cos\theta' + \tan\theta' \cdot \sin\theta)$ will be within a range of the optical path length between neighboring peaks of a coherency curve of multi-mode semiconductor laser. This suppresses the adverse effect the diffracted stray light will have on an interference signal used for position detection.

An optical displacement measurement device according to the present invention includes a multi-mode semiconductor laser light source oscillating at a plurality of frequencies, and a diffraction grating moved relative to the multi-mode semiconductor laser light source. The laser light radiated from the multi-mode semiconductor laser light source via the diffraction grating and diffracted by the diffraction grating is made to interfere and measurement is made of the amount of movement of the diffraction grating. The device further includes a transparent protective layer of a refractive index n and a thickness L. The transparent protective layer is formed to cover a surface where the diffraction grating is formed. The protective layer has a range of thickness L such that, with an angle θ between a line normal to the protective layer and an incident light beam and an angle θ' between diffracted light generated by the diffraction grating and reflected by a boundary surface of the protective layer to become stray light to be re-incident on the diffraction grating and a line normal to the diffraction grating, interference light is of an intensity of interference such that an optical path difference Δ between the stray light and light interfering with the stray light represented by $$\Delta = 2L(n/\cos\theta' + \tan\theta' \cdot \sin\theta)$$

will amount to not higher than 2% of the intensity of interference of the interference light for the optical path length difference Δ=0.

Effect of the Invention

The optical displacement measurement device according to the present invention includes the multi-mode semiconductor laser light source oscillating at a plurality of frequencies, and the diffraction grating moved relative to the multi-mode semiconductor laser light source. The laser light radiated from the multi-mode semiconductor laser light source via the diffraction grating and diffracted by the diffraction grating is made to interfere and measurement is made of the amount of movement of the diffraction grating. The device further includes the transparent protective layer of a refractive index and a thickness L. The transparent protective layer is formed to cover a surface where the diffraction grating is formed.

An optical path difference Δ between the stray light and light interfering with the stray light is represented by Δ=2L (n/cos θ'+tan θ'·sin θ) with an angle θ between a line normal to the protective layer and an incident light beam and an angle θ' between diffracted light generated by the diffraction grating and reflected by a boundary surface of the protective layer to become stray light to be re-incident on the diffraction grating and a line normal to the diffraction grating, the protective layer the refractive index of which is n has a range of thickness L such that, the interference signal intensity for the optical path length difference Δ=2L(n/cos θ'+tan θ'·sin θ) will amount to not higher than 2% of the interference signal intensity for the optical path length difference Δ=0. With the device of the present invention, it is possible to suppress variations of the interference signal due to the stray light to improve interpolation accuracy of the position detection signal and detection accuracy.

BEST MODE FOR CARRYING OUT THE INVENTION

An embodiment of the present invention will now be described in detail with reference to the drawings.

Figure 1:
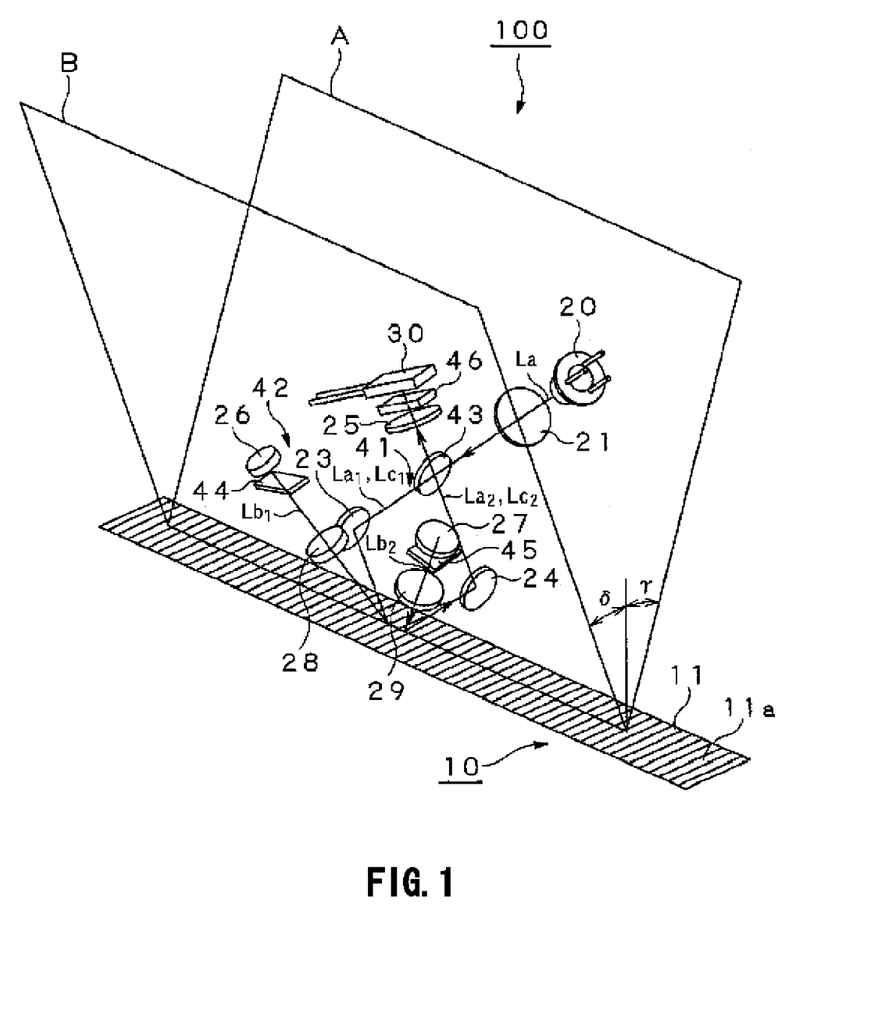
FIG. 1 is a perspective view showing an arrangement of an optical displacement measurement device according to the present invention.

The present invention is applied to an optical displacement detection device 100 shown for example in FIG. 1.

This optical displacement detection device 100 includes an optical scale 10 carrying thereon a reflection configuration diffraction grating 11. A coherent light source 20, employing the multi-mode semiconductor laser, oscillating at a plurality of frequencies, radiates laser light via the diffraction grating 11 provided on the optical scale 10. The laser light diffracted by the diffraction grating 11 is brought into an interference state and the amount of movement of the diffraction grating 11 is measured to detect a position of a moving portion of, for example, a machine tool.

Figure 2:
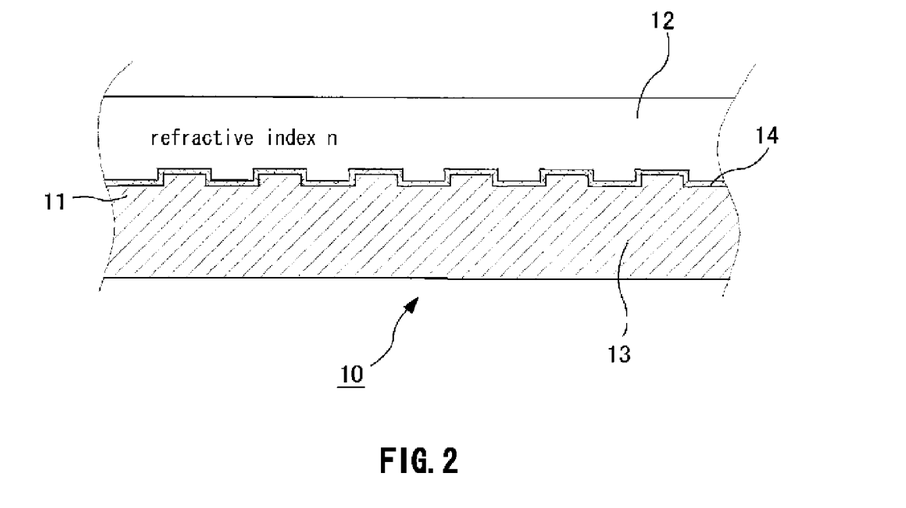
FIG. 2 is a cross-sectional view schematically showing a structure of an optical scale applied to the optical displacement measurement device according to the present invention.

The optical scale 10 is a reflection configuration scale for a grating interferometer adapted to detect changes in the phase of light caused by the movement of the diffraction grating 11 to detect a position. Referring to FIG. 2, the optical scale includes a base substrate 13 of glass or ceramics and the diffraction grating 11 having a relief structure. A reflection film 14 is formed on the surface of the base substrate, and a transparent protective layer 12, with a refractive index n, is formed thereon to a thickness L.

The protective layer has a range of thickness L such that, with an angle θ between a line normal to the protective layer and an incident light beam and an angle θ' between diffracted light generated by the diffraction grating and reflected by a boundary surface of the protective layer to become stray light to be re-incident on the diffraction grating and a line normal to the diffraction grating, interference light is of an intensity of interference such that an optical path difference between the stray light and light interfering with the stray light represented by $$\Delta = 2L(n/\cos\theta' + \tan\theta' \cdot \sin\theta)$$

will amount to not higher than 2% of the intensity of interference of the interference light for the optical path length difference $\Delta=0$.

Referring to FIG. 1, the optical displacement detection device 100 includes a virtual inclined reference plane A and another virtual inclined plane B. The virtual inclined plane A is inclined at an angle γ relative to a virtual reference plane that is parallel to a normal line vector and that includes a virtual straight line running parallel to the direction of a grating vector on a grating surface 11a of the diffraction grating 11. The virtual inclined plane A also includes the virtual straight line. The virtual inclined plane B is inclined at an angle δ relative to the virtual reference plane and also includes the virtual straight line. The inclined surfaces A and B are on the same side of the grating surface 11a of the diffraction grating 11.

Figure 3:
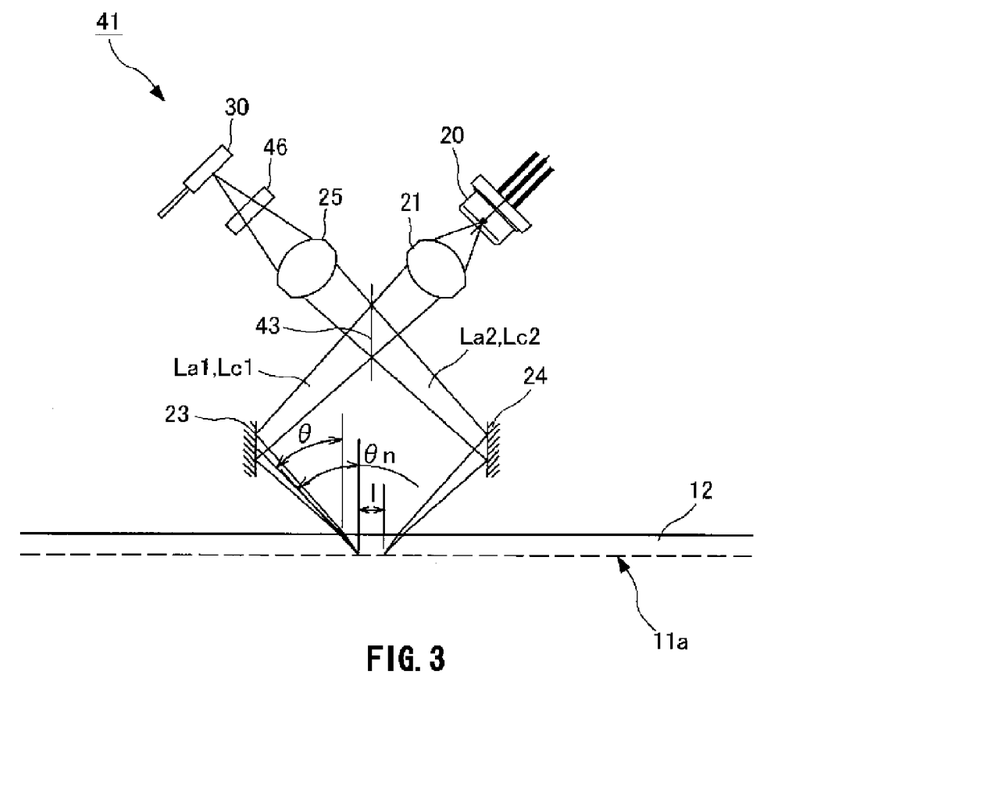
FIG. 3 is a side view showing components arranged on an inclined surface A of the optical displacement measurement device as viewed from a direction normal to a virtual reference plane including a single virtual straight line parallel to the grating vector direction and extending parallel to a normal line vector.
Figure 4:
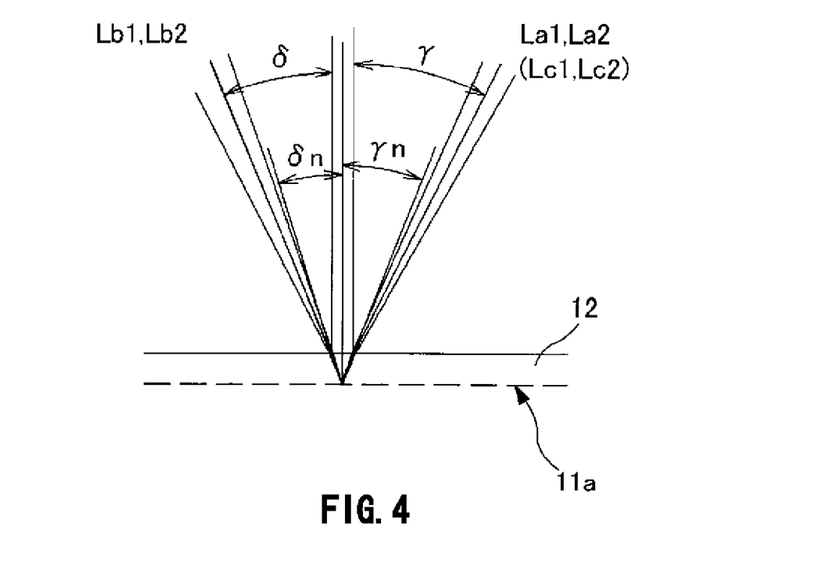
FIG. 4 is a side view showing the coherent light incident on the diffraction grating of the optical displacement measurement device and light diffracted by the diffraction grating.
Figure 5:
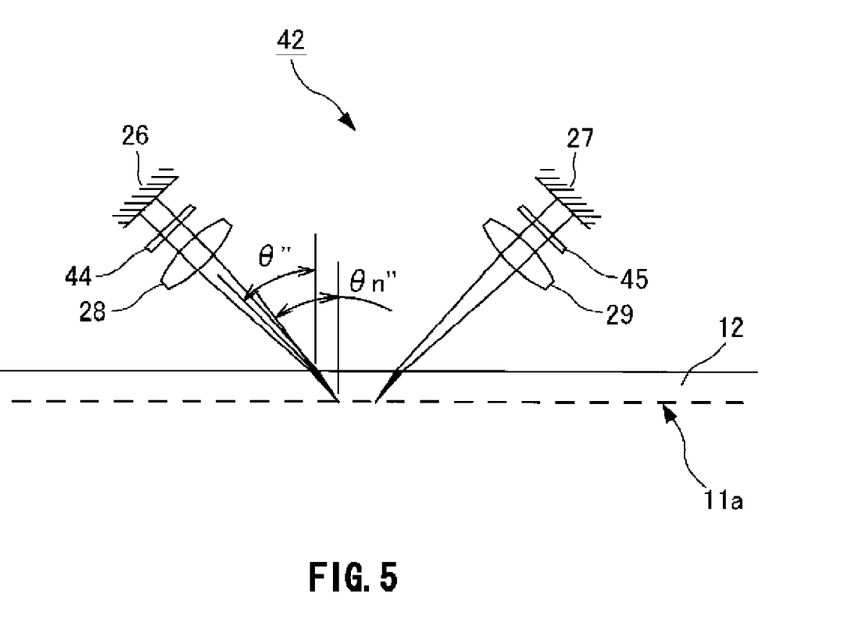
FIG. 5 is a side view showing components arranged on an inclined surface B of the optical displacement measurement device as viewed from a direction normal to a virtual reference plane including a single virtual straight line parallel to the grating vector direction and extending parallel to a normal line vector.

FIG. 3 depicts a side view, looking from a direction normal to the inclined plane A, showing component elements in this optical displacement detection device 100 which are arranged on the inclined plane A. FIG. 4 depicts a coherent light beam incident on the diffraction grating 11, and a light beam diffracted by the diffraction grating 11, when looking from the grating vector direction. FIG. 5 depicts a side view of component elements arranged on the inclined plane B, looking from a direction normal to the inclined plane B.

Referring to FIGS. 1 and 3, the optical displacement detection device 100 includes a coherent light source 20, radiating a coherent light beam La, a light receiving element 30 and an illumination/light receiving optical system 41. The light receiving element 30 receives two light beams Lc1, Lc2, which interfered with each other, to generate an interference light beam. The illumination/light receiving optical system 41 splits the coherent light beam La, radiated from the coherent light source 20, into two coherent light beams La1, La2 which are then illuminated on the diffraction grating 11. The illumination/light receiving optical system 41 also superposes the twice-diffracted light beams Lc1, Lc2, coming from the diffraction grating 11, one upon the other. These superposed light beams are then illuminated on the light receiving element 30.

The illumination/light receiving optical system 41 includes a first image-forming element 21 that forms an optical image of the coherent light beam La, radiated from the coherent light source 20, on the grating surface 11a of the diffraction grating 11. The illumination/light receiving optical system 41 also includes a polarization beam splitter 43 that splits the coherent light beam La, radiated from the coherent light source 20, into the two coherent light beams La1, La2 having the directions of light polarization perpendicular to each other. The polarization beam splitter also superposes the twice-diffracted light beams Lc1, Lc2 having the directions of light polarization perpendicular to each other. The illumination/light receiving optical system 41 also includes a reflector 23 that reflects one La1 of the coherent light beams as split by the polarization beam splitter 43 and that also reflects the twice-diffracted light beam Lc1 coming from the diffraction grating 11. The illumination/light receiving optical system 41 also includes a reflector 24 that reflects the other La2 of the coherent light beams as split by the polarization beam splitter 43 and that also reflects the twice-diffracted light beam Lc2. The illumination/light receiving optical system 41 also includes a second image-forming element 25 that forms optical images of the two twice-diffracted light beams Lc1, Lc2 on an image-forming surface of the light receiving element 30. These two twice-diffracted light beams Lc1, Lc2 are superposed one on the other by the polarization beam splitter 43 and have the directions of light polarization perpendicular to each other. The illumination/light receiving optical system 41 further includes a polarizer 46 that take out components of the same direction of light polarization from the twice-diffracted two light beams Lc1, Lc2 that are superposed one on the other by the polarization beam splitter 43 and that have the directions of light polarization perpendicular to each other.

In the illumination/light receiving optical system 41, the respective components are arranged so that optical paths for the coherent light beams La (La1, La2) transmitted through the optical system and the optical paths for the twice-diffracted light beams Lc1, Lc2 will be formed on the inclined plane A. Thus, the angle of incidence and the angle of diffraction of the coherent light beams La1, La2 and the twice-diffracted light beams Lc1, Lc2, as seen from the direction of the grating vector, are γ and δ, respectively, as shown in FIG. 4. In the protective layer, the angle of incidence angle and the angle of diffraction are $\gamma_n$ and $\delta_n$, respectively. The angle γ is set at a value for which the 0th order light is not mixed into the optical path. By setting the angle γ at ca. 10°, it is possible in most cases to prevent the 0th order light from mixing into the optical path.

The coherent light beam La, radiated from the coherent light source 20, is incident on the polarization beam splitter 43 of the illumination/light receiving optical system 41 as its direction of light polarization is tilted by 45° relative to the polarization beam splitter 43.

The polarization beam splitter 43 splits the incident coherent light beam La into two coherent light beams La1, La2 whose directions of light polarization are perpendicular to each other. The coherent light beam La1, transmitted through the polarization beam splitter 43 of the illumination/light receiving optical system 41, becomes a P-polarized light beam, while the coherent light beam La2, reflected thereby, becomes the S-polarized light beam.

The light beams Lc1, Lc2, coming from the diffraction grating 11 after diffraction twice, are incident on the polarization beam splitter 43. Note that the twice-diffracted light beam Lc1, inherently a P-polarized light beam, has its direction of light polarization rotated by 90° by a reflection optical system 42, as later explained, and thus becomes an S-polarized light. Similarly, the twice-diffracted light beam Lc2, inherently an S-polarized light beam, has its direction of light polarization rotated by 90° by the reflection optical system 42 to become a P-polarized light. Hence, the polarization beam splitter 43 reflects the twice-diffracted light beam Lc1, which is an S-polarized light beam, while transmitting the twice-diffracted light beam Lc2, which is a P-polarized light beam, such that these two twice-diffracted light beams Lc1, Lc2 are superposed one upon the other.

The reflector 23 reflects the coherent light beam La1, transmitted through the polarization beam splitter 43, such as to illuminate the light beam on a preset site on the grating surface 11a of the diffraction grating 11. The reflector 23 also reflects the twice-diffracted light beam Lc1 from the diffraction grating 11 to illuminate the so reflected light beam on the polarization beam splitter 43.

The reflector 24 reflects the coherent light beam La2, reflected by the polarization beam splitter 43, onto a preset site of the grating surface 11a of the diffraction grating 11. The reflector 24 also reflects the twice-diffracted light beam $L_{C2}$ from the diffraction grating 11 to illuminate it on the polarization beam splitter 43.

The reflectors 23, 24 respectively illuminate the coherent light beams La1, La2 onto preset sites of the grating surface 11a so that the angle of incidence of each coherent light beam as seen from the direction shown in FIG. 3 will be θ (the angle in the protective layer is $\theta_n$). It is noted that the reflectors 23, 24 are arranged so that the reflection surfaces thereof face each other. Hence, the directions of light incidence in the grating vector direction of the coherent light beams La1, La2 are opposite to each other. By the reflectors 23, 24, the coherent light beams La1, La2 from the reflectors 23, 24 are made to be incident on the sites of the diffraction grating which are spaced apart from each other a preset length along the grating vector. The length between the point of incidence of the coherent light beam La1 and that of the coherent light beam La2 is l, where l denotes a distance not less than 0.

The polarizer 46 is passed through by the twice-diffracted light beam Lc1, an S-polarized light beam, and by the twice-diffracted light beam Lc2, a P-polarized light beam, superposed on the light beam Lc1 by the polarization beam splitter 43. The polarizer 46 transmits components of the twice-diffracted light beams Lc1, Lc2 having the directions of light polarization of 45°, such as to provide light beams of the same direction of light polarization.

The light receiving element 30 receives the two twice-diffracted light beams Lc1, Lc2 transmitted through the polarizer 46.

In the optical displacement detection device 100, the coherent light beam La1 is incident on the diffraction grating 11 and thereby diffracted to produce a once-diffracted light beam Lb1. Also, the coherent light beam La2 is illuminated on the diffraction grating 11 and thereby diffracted to produce a once-diffracted light beam Lb2. The angle of diffraction of the once-diffracted light beam Lb1 and that of the once-diffracted light beam Lb2 in the direction of the grating vector are δ ($\delta_n$ in the protective layer), as shown in FIG. 4. That is, the once-diffracted light beams Lb1, Lb2 are generated along the inclined plane B. The angle of diffraction on the inclined plane B of each of the once-diffracted light beams Lb1, Lb2 as seen from the direction shown in FIG. 5 is θ" ($\theta_n$" in the protective layer). Note that the outgoing direction along the direction of the grating vector of the once-diffracted light beam Lb1 is opposite to that of the once-diffracted light beam Lb2.

If δ is not larger than 10°, $\gamma_n$, $\delta_n$, $\theta_n$ and $\theta_n$" are related to one another by the following relationship:

$$\sin \theta_n'' = m\lambda_0/\Lambda_n - \sin \theta_n$$

where Λ denotes a pitch of the grating, $\lambda_0$ denotes the center wavelength of the coherent light in vacuum and m denotes the number of the order of diffraction. In the present embodiment, m=1.

$$\sin \gamma_n/\sin \delta_n = \cos \theta''/\cos \theta_n$$

The optical displacement detection device 100 includes the reflection optical system 42, as shown in FIGS. 1 and 5.

The reflection optical system 42 includes a reflector 26 that reflects the once-diffracted light beam Lb1, generated from the coherent light beam La1, such as to re-illuminate it on the diffraction grating 11. The reflection optical system 42 also includes a reflector 27 that reflects the once-diffracted light beam Lb2, generated from the coherent light beam La2, to re-illuminate the reflected light beam on the diffraction grating 11. The reflection optical system 42 also includes a third image-forming element 28 that collimates the once-diffracted light beam Lb1, generated from the coherent light beam La1, to illuminate the collimated light beam on the reflector 26. The reflection optical system 42 also includes a fourth image-forming element 29 that collimates the once-diffracted light beam Lb2, generated from the coherent light beam La2, to illuminate the collimated light beam on the reflector 27. The reflection optical system 42 further includes a quarter wave plate 44, provided on the optical path of the once-diffracted light beam Lb1, and another quarter wave plate 45 provided on the optical path of the once-diffracted light beam Lb2.

In the reflection optical system 42, the angle of diffraction of each of the two once-diffracted light beams Lb1, Lb2, as seen from the grating vector direction, is 6, as previously mentioned. Hence, the components are arranged so that optical paths of the once-diffracted light beam Lb1 and the once-diffracted light beam Lb2 being transmitted will be formed on the inclined plane B. In addition, the reflectors 26, 27 of the reflection optical system 42 are arranged so that they will reflect the once-diffracted light beams Lb1, Lb2, diffracted at the angle of diffraction θ" as seen from the direction of FIG. 5, in a perpendicular direction.

The quarter wave plate 44 is arranged with its optical axis tilted 45° relative to the direction of light polarization of the once-diffracted light beam Lb1 of the P-polarized light beam incident from the diffraction grating 11. The once-diffracted light beam Lb1 traverses the quarter wave plate 44 twice so as to form an optical image on the diffraction grating 11. Hence, the once-diffracted light beam Lb1, which has been the P-polarized light beam, is turned into an S-polarized light beam, which is illuminated on the diffraction grating 11.

The quarter wave plate 45 is arranged with its optical axis tilted 45° relative to the direction of light polarization of the once-diffracted light beam Lb2 of the S-polarized light beam incident from the diffraction grating 11. The once-diffracted light beam Lb2 traverses the quarter wave plate 45 twice so as to form an optical image on the diffraction grating 11. Hence, the once-diffracted light beam Lb2, which has been the S-polarized light beam, is turned into a P-polarized light beam which is illuminated on the diffraction grating 11.

The once-diffracted light beams Lb1, Lb2 are incident from the reflection optical system 42 on the diffraction grating 11. Like the angle of diffraction of the once-diffracted light beams Lb1, Lb2, the angle of incidence of the once-diffracted light beams Lb1, Lb2, as seen from the direction of the grating vector, is δ ($\delta_n$ in the protective layer). Similarly, like the diffraction angle, the angle of incidence as seen from the direction of FIG. 5 is θ" ($\theta_n$" in the protective layer).

The twice-diffracted light beams Lc1, Lc2 are generated by diffraction of the once-diffracted light beams Lb1, Lb2. Like the incidence angle of the coherent light beams La1, La2, the diffraction angle of the twice-diffracted light beams Lc1, Lc2, as seen from the direction of the grating vector, is $\gamma$ ($\gamma_n$ in the protective layer). Also, like the angle of incidence of the coherent light beams La1, La2, the diffraction angle as seen from the direction of FIG. 3 is $\theta$ ($\theta_n$ in the protective layer). The relationship between the angle in air and that in the protective layer is represented by the Snell's law.

Hence, the twice-diffracted light beams Lc1, Lc2 travel on the same optical path as that of the coherent light beams La1, La2 in the reverse direction to fall on the polarization beam splitter 43.

The optical displacement detection device 100 also includes a position detection unit, not shown, for detecting the position of movement of the diffraction grating 11 based on an interference signal from the light receiving element 30.

In the present optical displacement detection device 100, the illumination/light receiving optical system 41 is arranged on the inclined plane A inclined at a preset tilt angle relative to the virtual reference plane. The reflection optical system 42 is mounted on the inclined plane B. Hence, the optical path of the coherent light beam may be separated from that of the diffracted light beam to increase the degree of freedom in implementing the device. The diffracted light beams Lb1, Lb2 may be caused to interfere with each other without allowing the 0th order diffracted light beam or the reflected light beam to mix into the illumination/light receiving optical system 41 or into the reflection optical system 42 from the grating surface 11a, thus assuring position measurement to high accuracy.

That is, in the present optical displacement detection device 100, the coherent light La, radiated from the coherent light source 20, traverses the first image-forming element 21, and is split by the polarization beam splitter 43 into two coherent light beams La1, La2, viz., the transmission side P-polarized light beam and the reflection side S-polarized light beam. Note that, in case the coherent light beam used is a semiconductor laser beam, the coherent light beam may be made to be incident as its direction of light polarization is inclined 45° relative to the polarization beam splitter 43. The two as-split coherent light beams La1, La2 are reflected by the reflectors 23, 24, respectively, such as to form optical images at substantially the same point in the vicinity of the grating surface 11a of the reflection configuration diffraction grating 11. It is necessary for the beam of the optical image to be of a diameter to encompass a sufficient number of grating lines to generate the diffracted light. On the other hand, the beam diameter is to be greater than scores of μm to avoid the effects of contaminants or grazes. An optimum beam diameter may be found by adjusting e.g., the numerical aperture of the image-forming optical system.

The light beams are incident on the diffraction grating 11 at an angle of incidence $\theta$. The beams diffracted by the diffraction grating 11 at the angle $\theta''$ pass through third and fourth image forming elements 28, 29 having focal points in the vicinity of the grating surface 11a of the diffraction grating 11. The diffracted beams then pass through quarter wave plats 44, 45 whose optical axes are inclined 45° relative to the directions of polarization of the respective beams. The diffracted beams are then reflected by reflectors 26, 27 placed at right angles to the optical axes of the beams so as to then re-traverse the quarter wave plates 44, 45 where the P-polarized light beams and the S-polarized light beams are turned into S-polarized light beams and into P-polarized light beams, respectively. The resulting light beams then traverse the third image-forming elements 28, 29 to form optical images in the vicinity of the grating surface 11a of the diffraction grating 11. The light beams diffracted by the diffraction grating 11 retrace the path the light beams followed as the incident light, in the return direction, that is, from the reflectors 23, 24 back towards the polarization beam splitter 43.

The polarization beam splitter 43 transmits the P-polarized light beam, while reflecting the S-polarized light beam. Hence, the two coherent light beams Lc1, Lc2 are superposed one on the other to travel towards the second image-forming element 25. The light beams, transmitted through the second image-forming element 25, traverse the polarizer 46 whose axis of light transmission is inclined 45° relative to the direction of light polarization. An optical image is thus formed in the vicinity of the light receiving surface of the light receiving element 30.

Let the values of the intensity of the two twice-diffracted light beams Lc1, Lc2, superposed together, be $I_1$, $I_2$, respectively, and let the displacement of the diffraction grating 11 in the direction of the grating vector be x. Also, let the initial phase be $\delta$. The intensity I of an interference signal, obtained by the light receiving element 30, may be represented by the following equation (1):

$$I = I_1 + I_2 + 2\sqrt{(I_1 \cdot I_2)} \cos(4Kx + \phi) \tag{1}$$

where
$K = 2\pi/\Lambda$, $\Lambda$ being the grating pitch. The position detection unit may thus detect the position of movement of the diffraction grating 11 based on the interference signal from the light receiving element 30.

In the above described configuration of the optical displacement detection device 100, the diffraction grating 11 is moved in the direction of the grating vector in response to the movement of the movable member, thereby producing a phase difference between the two twice-diffracted light beams Lc1, Lc2. In the optical displacement detection device 100, these two twice-diffracted light beams Lc1, Lc2 are made to interfere with each other in order to detect an interference signal. From the so detected interference signal, the phase difference between the two twice-diffracted light beams Lc1, Lc2 is found to detect the position of movement of the diffraction grating 11.

In this manner, the coherent light beams La1, La2 form optical images in the vicinity of the grating surface 11a, and the light beams are then made to traverse the image-forming elements 28, 29 each having a focus in the vicinity of the grating surface 11a. The light beams are then reflected by the reflectors 26, 27. Thus, even if the diffraction grating 11 is tilted, the once-diffracted light beam is incident on the reflectors 26, 27 at right angles thereto at all times. Hence, the reflected light beams re-trace the optical path along which the light beam traveled as the incident light beams. There is no risk of variations in the interference signal because the optical path of the twice-diffracted light beam is not deviated.

The inclined plane A, within which the coherent light source 20 and the light receiving element 30 are disposed, is inclined at the angle $\gamma$ relative to the grating surface 11a, while the inclined plane B, within which the reflectors 26, 27 are disposed, is inclined at the angle $\delta$ relative to the grating surface 11a. The left and right optical paths are symmetrically arranged. The positions of the reflectors 26, 27 are adjusted so that the optical path lengths of the left and right optical paths will be equal to each other.

This may prevent measurement errors from being produced due to variations in wavelengths. To allow for such adjustment, the coherent light source 20 with a short coherence length may be used. For example, if a multi-mode semiconductor laser with the coherence length of hundreds of μm is used, it is sufficient to adjust the positions of the reflectors 26, 27 so that the percentage modulation (visibility) of the interference fringes will be of a maximum value. By so doing, the optical path length difference may be suppressed to lower than scores of μm.

Figure 6:
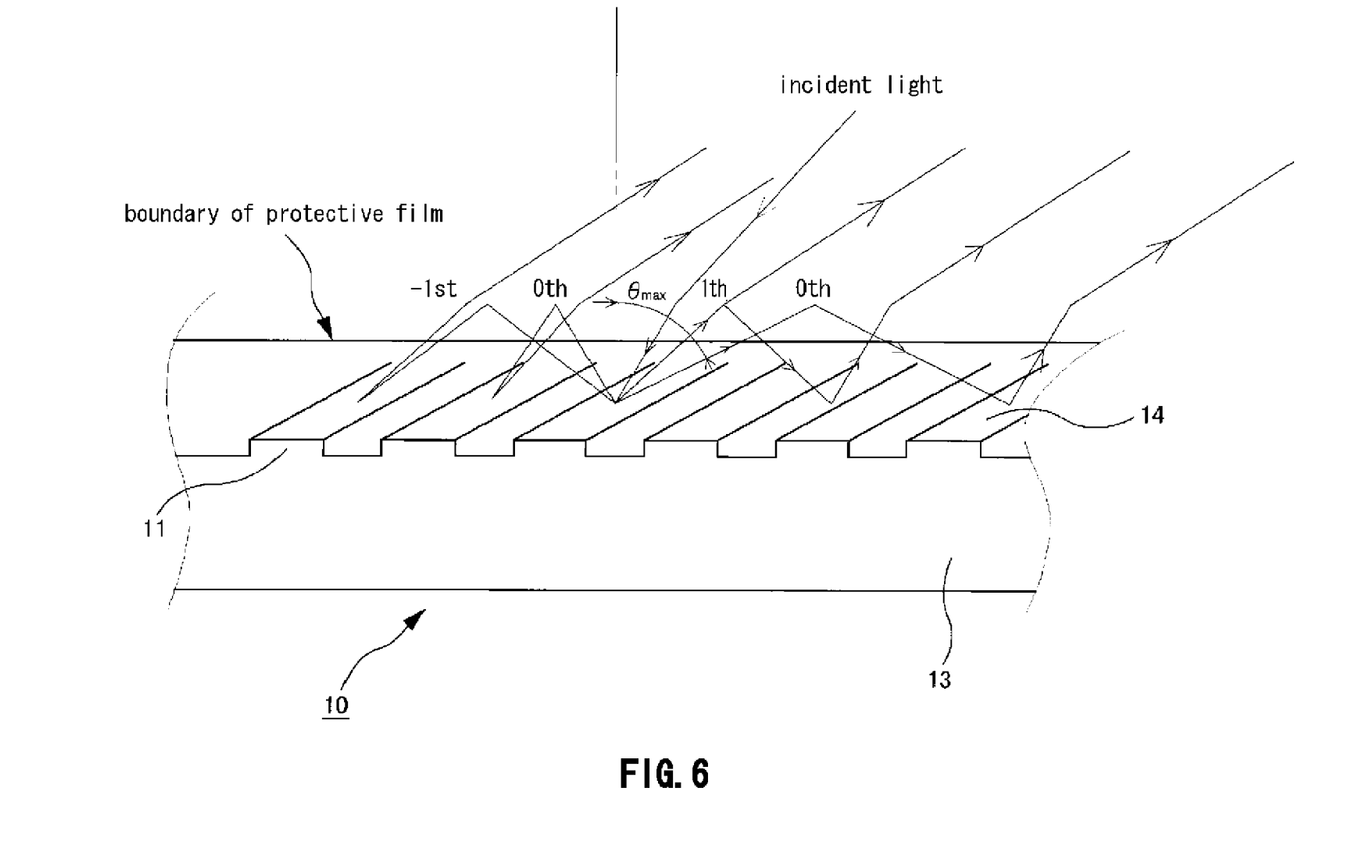
FIG. 6 is a perspective view schematically showing diffracted light generated from light incident on an optical scale carrying thereon the diffraction grating.

In the optical scale 10, carrying thereon the diffraction grating 11, diffracted light beams of a wide variety of the ordinal numbers are generated from the incident light having a maximum angle $\theta_{max}$, as shown in FIG. 6. These diffracted light beams are reflected on the boundary surface of the protective layer 12 so as to be re-incident on the diffraction grating 11. The re-incident light beams undergo second diffraction so as to be diffracted in approximately the same direction as that of the once-diffracted light beams.

In the second diffraction, as well, diffracted light beams are generated in a variety of directions. However, if a certain condition is satisfied, a diffracted light beam is generated in the same direction as the direction of the initial 1st order diffracted light beam. This condition may be derived from the equation (2A) shown below. For example, if the 0th order diffracted light beam is reflected on the boundary surface, it is re-incident on the diffraction grating at an angle. Hence, the 1st order diffracted light beam on second diffraction is diffracted in the same direction as the direction of the initial 1st order diffracted light beam. It is also seen that, if the −1st order diffracted light beam is reflected on the boundary surface, the 2nd-order diffracted light beam on second diffraction is diffracted in the same direction as the direction of the initial 1st order diffracted light beam. Such diffracted light beam may be derived by changing the sign of $\theta'$, obtained on substituting m=0 and m=−1 in the equation (2A), and by re-substituting the result into $\theta_n$. These diffracted light beams are referred to below as stray light beams of the diffracted light or as diffracted stray light beams. These stray light beams are ready to interfere with the 1st-order diffracted light beams and may produce variations of the interference signal for position detection by slightest changes in thickness of the protective layer 12 to give rise to errors in position detection. There is a possibility that the stray light beams of the diffracted light are re-reflected on the boundary surface between air and the protective layer 12 to generate re-diffracted light beams. However, given that the refractive index n of the protective layer 12 is ca. 1.5, the reflectance on the boundary surface between the protective layer 12 and air is ca. 4%, and hence is 0.16% on second reflection. Since this value may be ignored, the possibility is not here considered. The interference between the stray light beams of the diffracted light similarly has only negligible effect as compared to the case of interference of the stray light with the 1-st order stray light beam and hence is not here considered.

Figure 7:
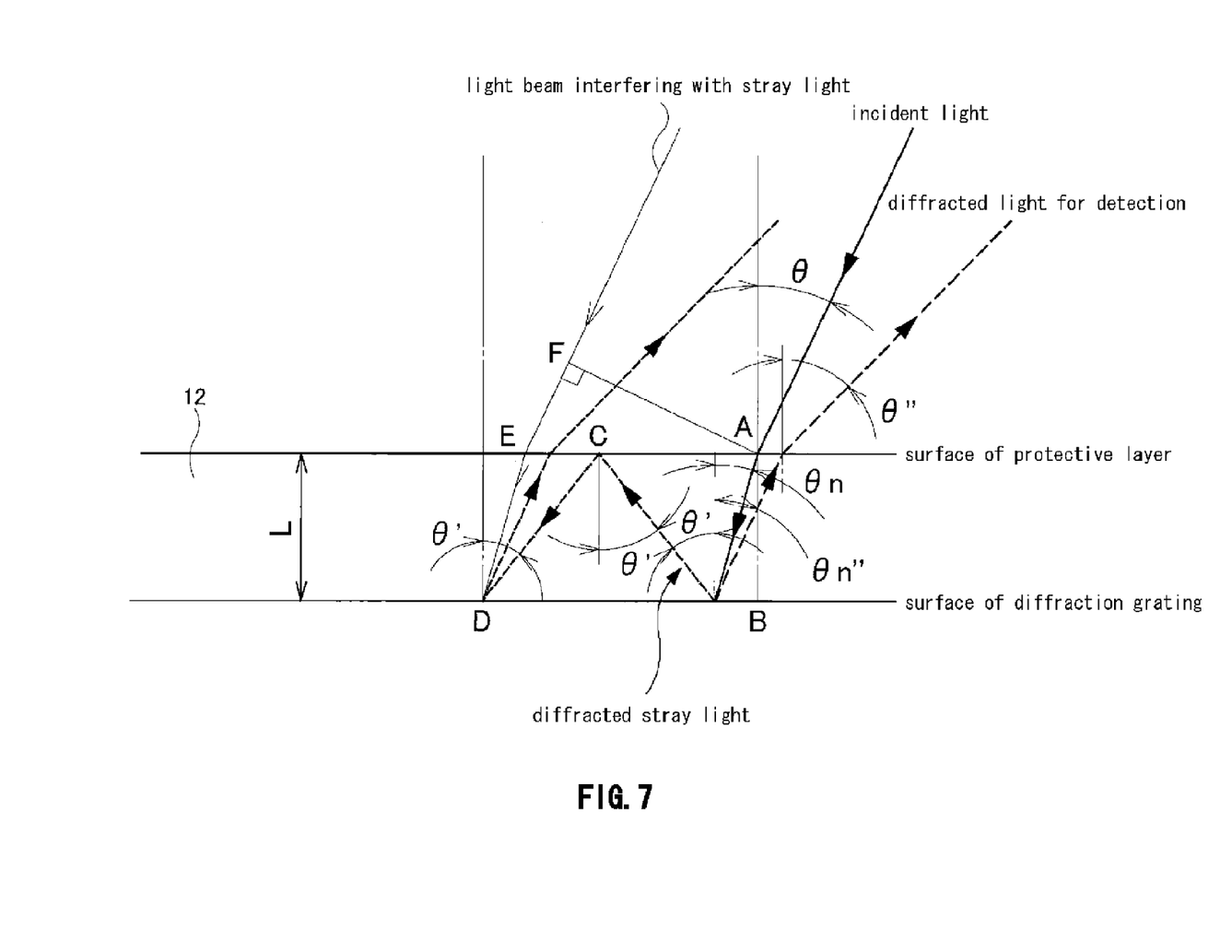
FIG. 7 is a diagrammatic view showing a first case of a film thickness of a protective layer formed on the optical scale and an optical path difference between a diffracted stray light beam and a light beam interfering with the diffracted stray light beam.
Figure 8:
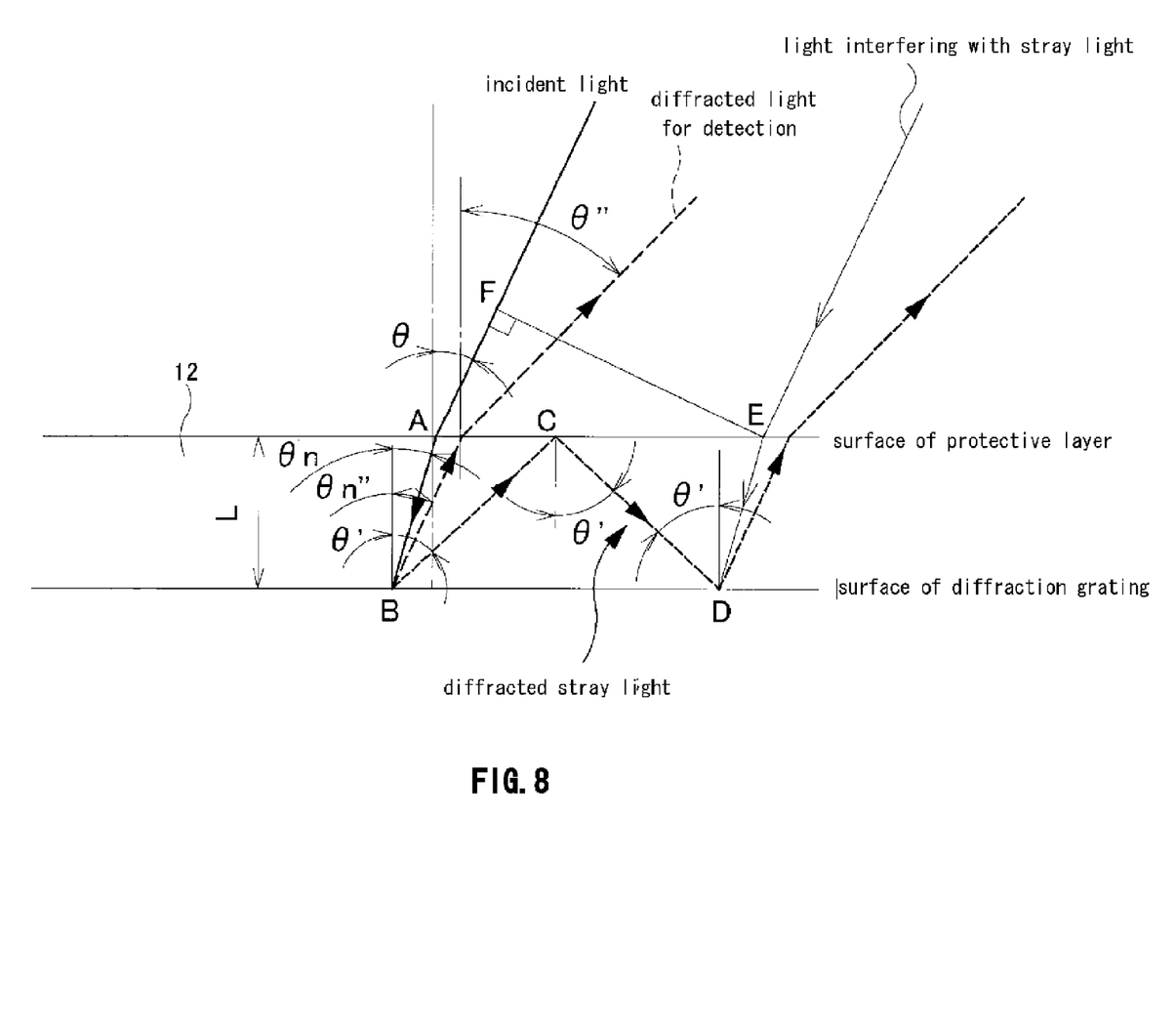
FIG. 8 is a diagrammatic view showing a second case of a film thickness of a protective layer formed on the optical scale and an optical path difference between a diffracted stray light and a light beam interfering with the diffracted stray light beam.

The relationship between the film thickness L of the protective film 12 and the intensity of interference in case of interference between the stray light beam of the diffracted light and the 1st order diffracted light beam will now be considered. The optical path lengths of these stray light beams differ from that of the 1st order diffracted light beam. The optical path length difference is labeled δ. Referring to FIGS. 7 and 8, let the film thickness of the protective film 12 be L, the refractive index of the protective layer 12 be n, an angle between the incident light and a line normal to the surface of the protective film 12 be θ, an angle between the diffracted light that becomes a stray light beam in the protective layer and a line normal to a grating surface be $\theta'$, the grating pitch be Λ, the number of the order of diffraction be m, and also let the center wavelength of the coherent light beams in vacuum be $\lambda_0$. If γ in FIG. 4 is 10° or less, the relationship of the following equation (2A) approximately holds:

$$\sin\theta' = m\lambda_0/\Lambda_n - \sin\theta_n \qquad \text{equation (2A)}$$

where $\sin\theta_n = \sin\theta/n$. The optical path difference Δ may be represented by the following equation (2B):

$$\Delta = 2L(n/\cos\theta' + \tan\theta' \cdot \sin\theta) \qquad \text{equation (2B)}$$

Figure 9A:
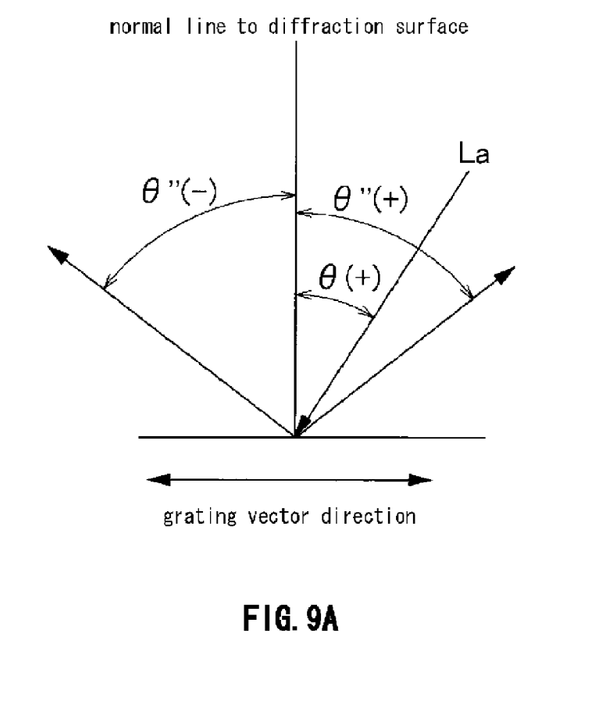
FIGS. 9(A) and 9(B) are diagrammatic views showing the outgoing direction of the ±1st order diffracted light beams generated by first diffraction by the diffraction grating of the optical scale in the optical displacement measurement device.
Figure 9B:
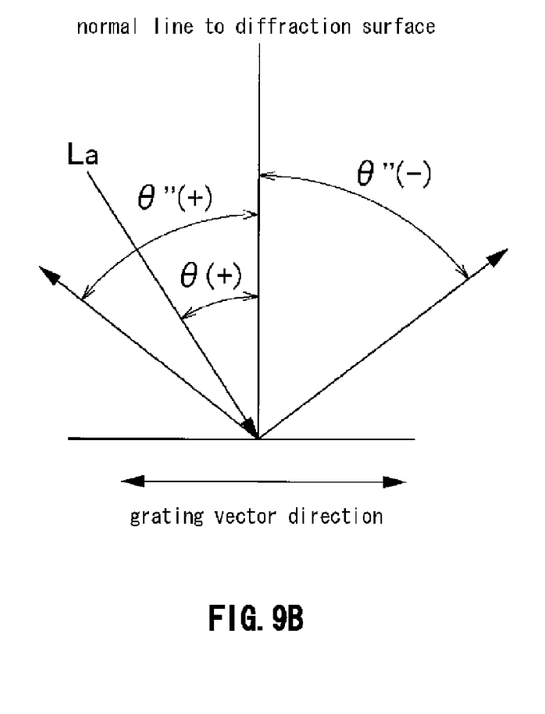

Here, note that the sign of the angle is as indicated in FIGS. 9(A) and (B).

That is, the optical path length difference Δ in FIG. 7 is such that $$\Delta = BCD + FA$$

$$BCD = 2Ln/\cos\theta'$$

$$FA = 2L\cdot\tan\theta'\cdot\sin\theta$$

while the optical path length difference Δ in FIG. 8 is such that $$\Delta = BCD - EF$$

$$BCD = 2Ln/\cos\theta'$$

$$FA = -2L\cdot\tan\theta'\cdot\sin\theta$$

where $\tan\theta'$ is minus in its value because of the manner of taking the sign of the angle.

Figure 10:
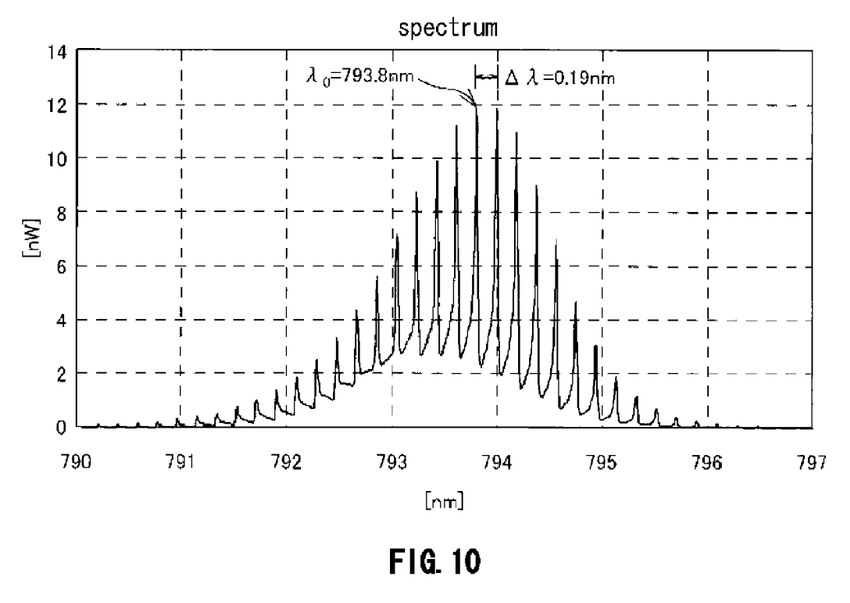
FIG. 10 is a graph showing an example oscillation spectrum of a multi-mode semiconductor laser used as a coherent light source in the optical displacement measurement device.
Figure 11A:
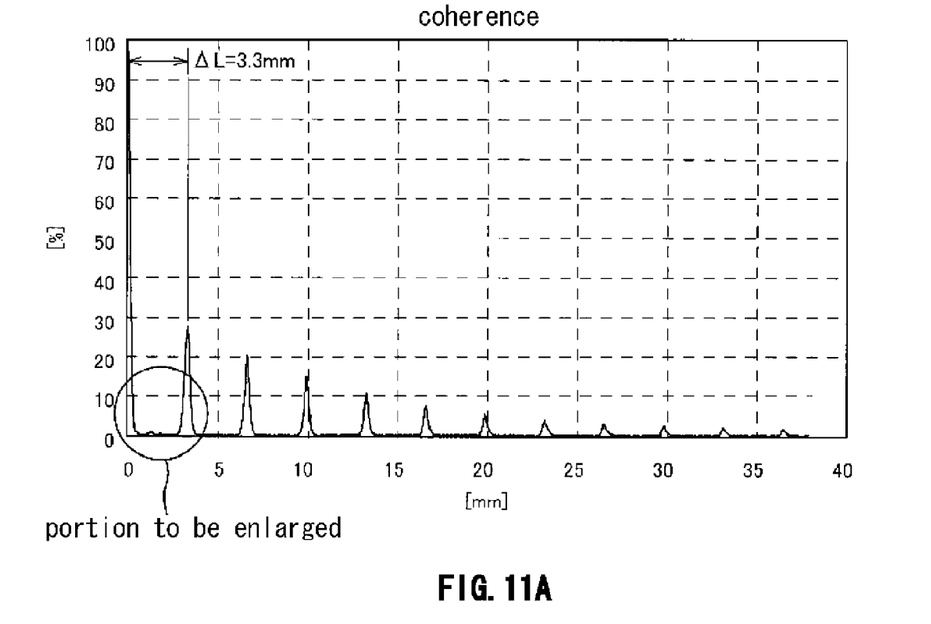
FIGS. 11(A) and 11(B) are graphs showing measured results of the relationship between the interference signal intensity and the optical path length difference of a multi-mode semiconductor laser in the optical displacement measurement device employing the multi-mode semiconductor laser as a coherent light source.
Figure 11B:
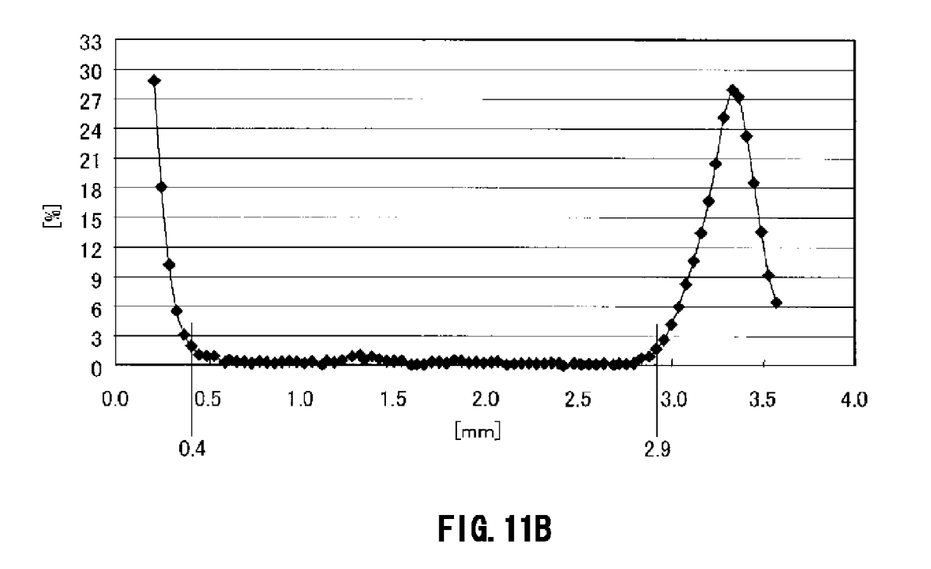

An example oscillation spectrum of a multimode semiconductor laser, used as the coherent light source 20, is shown in FIG. 10. In an optical displacement measurement device 100, in which the multi-mode semiconductor laser of the oscillation spectrum shown in FIG. 10 is used as a coherent light source 20, the relationship between the optical path length difference of the multi-mode semiconductor laser and the intensity of an interference signal (coherency curve) was actually measured. The results of the measurement are shown in FIG. 11(A), and a portion of the results, shown in FIG. 11(A), is shown enlarged in FIG. 11(B). In FIGS. 11(A) and (B), the optical path length difference in (mm) is plotted on the abscissa and the intensity of interference (%) is plotted on the ordinate. In the present Example, the center wavelength $\lambda_0$ is 793.8 nm, while the interval Δλ of spectral peaks is 0.19 nm and the peak interval ΔL of the coherency curve is 3.3 mm.

The relationship between the peak interval Δλ of the spectral peaks and the peak interval ΔL of the coherency curve may be represented by the following equation (3):

$$\Delta L = \lambda_0^2/\Delta\lambda \qquad \text{equation (3)}$$

based on the reasoning that waves having the periods of the respective spectral peaks are superposed together to produce beats, with the peaks of the beats proving to be the peaks of the coherency curve.

If the value of the center wavelength $\lambda_0$ of the coherent light, that is, 793.8 nm, and the value of the spectral peak interval Δλ, that is, 0.19 nm, shown in FIG. 10, are substituted into the equation (3), we obtain $$793.8^2/0.19 \times 10^{-6} = 3.3 \text{ mm}$$

which is coincident with the peak interval ΔL of the coherency curve shown in FIG. 11.

By selecting the light source having a proper spectral peak interval, in this manner, it is possible to obtain the required peak interval of the coherency curve.

The value of the width of each individual peak of the coherency curve is influenced by a wide variety of conditions of the spectral curve and hence is difficult to express by a simplified mathematical equation. However, the larger the number of spectral curves, the narrower is the width of the peak of the coherency curve.

Figure 12:
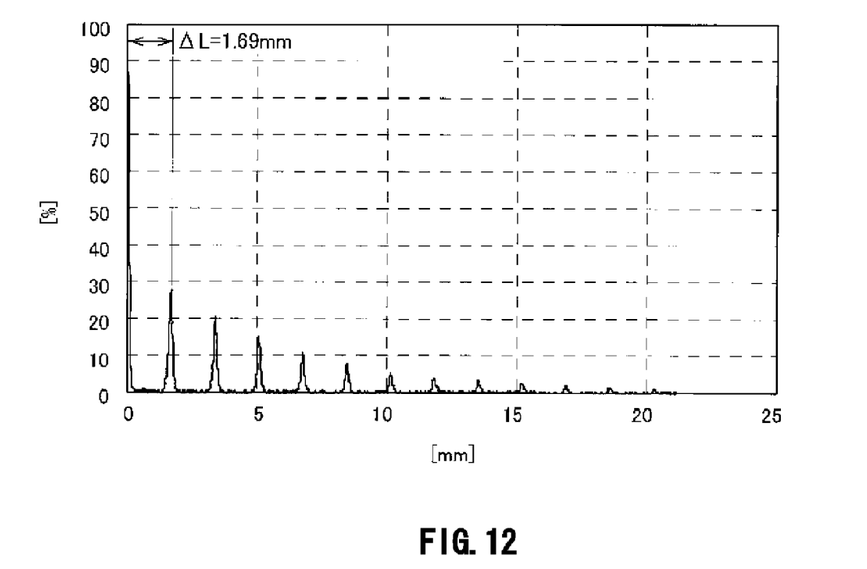
FIG. 12 is a graph showing another example of a coherency curve.

For example, it is now assumed that a spectral curve is similar in shape to the spectral curve shown in FIG. 10, with the center wavelength $\lambda_0$ being 650 nm and the peak interval Δλ being 0.25 nm. The peak interval ΔL of the coherency curve is $$650.0^2/0.25 \times 10^{-6} = 1.69 \text{ mm}$$

in which the coherency curve is as shown in FIG. 12.

If, in the multi-mode semiconductor laser, whose characteristic is shown in FIG. 10, the intensity of interference is 2% or less and is constant for the optical path length difference of two light beams, made to interfere with each other, being in a range of from 0.4 mm to 2.9 mm, as shown in FIG. 11. It is now assumed that the stray light beam such as that shown in FIG. 8 is produced and multi-mode semiconductor laser is used as the coherent light. If, in such case, the above equation (2), that is, Δ=2L(n/cos θ'+tan θ'·sin θ)

is in a range from 0.4 mm to 2.9 mm, the difference between the optical path length of the stray light and that of the 1st order diffracted light is within this range, that is, within a range between two interference peaks. It is thus possible to avoid strong interference between the 1st order diffracted light and the diffracted stray light. Hence, variations in the interference signal may be minimized to reduce errors to a minimum.

The following is a case where this condition is applied to the optical displacement measurement device 100.

It is assumed that the angle of incidence θ=28.2°, the refractive index n of the protective layer 12 is 1.46 and θ' is the angle for the 1st order diffracted stray light which is 12.6°. Hence, with the film thickness L of the protective layer 12 equal to 75 μm, Δ=0.24 mm and the intensity of interference is ca. 18.0%. With the film thickness L of the protective layer 12 equal to 133 μm, Δ=0.43 mm and the intensity of interference light is ca. 2%.

Figure 13:
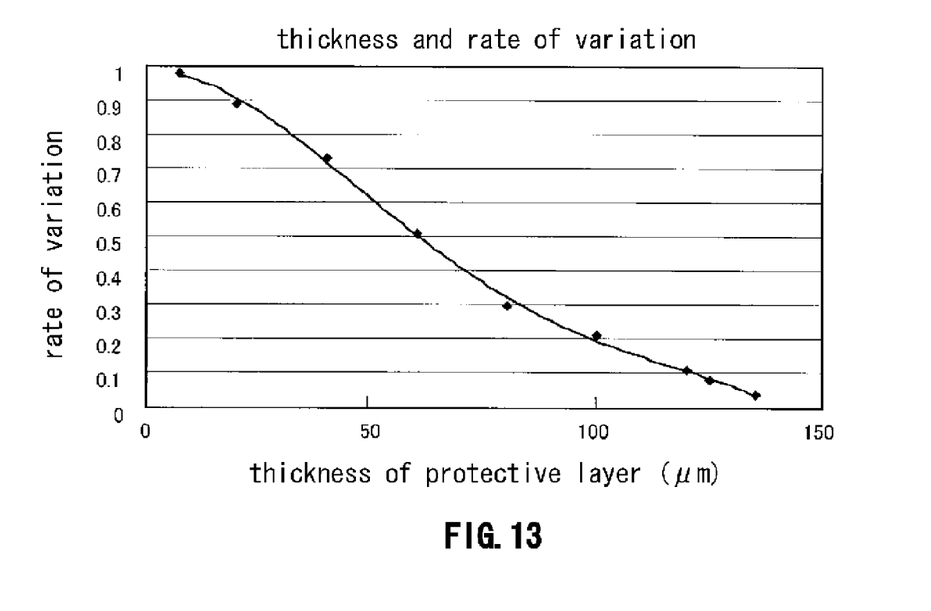
FIG. 13 is a graph showing variations of an interference signal for position detection produced due to the diffracted stray light when the optical scale is swept with the multi-mode semiconductor laser in an optical system of the optical displacement measurement device.

It is assumed that, in the optical system of the optical displacement measurement device 100, the multi-mode semiconductor laser, having the coherency curve of FIG. 11, is used as the coherent light source 20 to scan the optical scale 10 having the structure shown in FIG. 6. FIG. 13 shows variations of the interference signal for position detection produced due to the diffracted stray light. In FIG. 13, the rate of variations is plotted on the ordinate and the thickness L of the protective layer 12 is plotted on the abscissa.

It is seen from FIG. 13 that, with the thickness L of the protective layer 12 equal to 75 μm, the rate of variations is large and is ca. 0.36, and that, with the thickness L of the protective layer 12 equal to 133 μm, the rate of variations is extremely small and is ca. 0.03.

Figure 14:
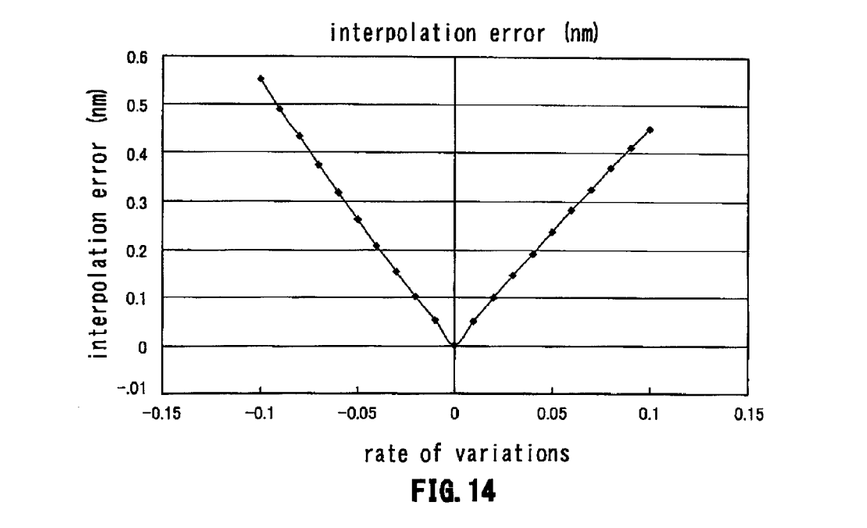
FIG. 14 is a graph showing the results of simulation of the relationship between the rate of variations and the interpolation error.

FIG. 14 shows the result of simulation of the relationship between the rate of variations of the interference signal and the interpolation error. The interpolation error is an error produced within one period of the interference signal. This error is produced by shifting of the center value of the interference signal brought about by variations of the interference signal, and is unavoidable due to variations in the sensitivities of the optical elements or the light receiving elements.

In calculating the interpolation error, the sum of the variations is assumed to be 5%.

From the results of the calculations, it may be seen that, if the variations are 0.03 or less, the interpolation error is 0.2 nm or less. This value is satisfactory even in case high precision position control is required, such as in a device for preparation of a semiconductor device.

The above results of measurement indicate that the thickness L of the protective layer is to be set so that, with an angle θ between a line normal to the protective layer and an incident light beam and an angle θ' between diffracted light generated by the diffraction grating and reflected by a boundary surface of the protective layer to become stray light to be re-incident on the diffraction grating and a line normal to the diffraction grating, an optical path difference Δ between the stray light and light interfering with the stray light represented by Δ=2L(n/cos θ'+tan θ'·sin θ)

will be less than an optical path length between neighboring peaks of the coherence curve of the multi-mode semiconductor laser. In this case, the adverse effects the diffracted stray light might have on the interference signal for position detection may be reduced to a minimum.

Figure 15:
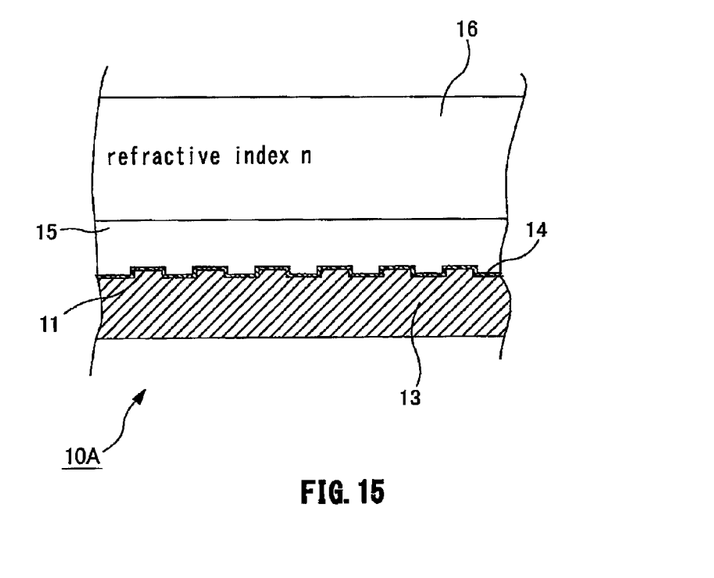
FIG. 15 is a cross-sectional view schematically showing another example structure of the optical scale used in an optical displacement measurement device 100.

It is possible for the optical displacement measurement device 100 to use an optical scale 10A having a structure shown in FIG. 15. In this optical scale 10A, a diffraction grating 11, having physical crests and recesses, is formed on a base substrate 13 of glass or ceramics, and a reflection film 14 is formed thereon. A transparent substrate, such as a glass substrate for protection, is bonded to the grating via an adhesive layer 15. In the present case, the stray light beam of the diffracted light is reflected on a boundary surface between the adhesive layer 15 and the transparent substrate 16 and on a boundary surface between the transparent substrate 16 and air. It is thus necessary in this case that the above condition is satisfied when the thickness of the adhesive layer 15 and the sum of the thickness of the adhesive layer 15 and that of the transparent substrate 16 are individually set at L. However, if the transparent substrate 16 is sufficiently thick such that the reflected light from the boundary surface between the transparent substrate 16 and air is not mixed into the optical path for position detection, the above condition does not have to be satisfied insofar as the sum of the thickness of the adhesive layer 15 and that of the transparent substrate 16 is concerned.

It should be understood by those skilled in the art that various modifications, combinations, sub-combinations and alterations may occur depending on design requirements and other factors insofar as they are within the scope of the appended claims or the equivalents thereof.

What is claimed is:

1. An optical displacement measurement device including a multi-mode semiconductor laser light source oscillating at a plurality of frequencies, and
   a diffraction grating moved relative to the multi-mode semiconductor laser light source; in which
   the laser light radiated from the multi-mode semiconductor laser light source via the diffraction grating and diffracted by the diffraction grating is made to interfere and measurement is made of the amount of movement of the diffraction grating; wherein the device further comprises
   a transparent protective layer of a refractive index n and a thickness L; the transparent protective layer being formed to cover a surface on which the diffraction grating is formed; wherein
   an angle θ between a line normal to the protective layer and an incident light beam and an angle θ' between diffracted light generated by the diffraction grating and reflected by a boundary surface of the protective layer to become stray light to be re-incident on the diffraction grating and a line normal to the diffraction grating, the protective layer has a range of thickness L such that, the interference signal intensity for an optical path difference between the stray light and light interfering with the stray light represented by Δ=2L(n/cos θ'+tan θ'·sin θ) will amount to not higher than 2% of the interference signal intensity for the optical path length difference Δ=0.

* * * * *